United States Patent [19]

Abe et al.

[11] Patent Number: 4,755,500

[45] Date of Patent: Jul. 5, 1988

[54] MOLDED CATALYST FOR CATALYTIC GAS REACTIONS

[75] Inventors: Kazunobu Abe; Toshikatsu Umaba, both of Sakai, Japan

[73] Assignee: Sakai Chemical Industry Co., Ltd., Osaka, Japan

[21] Appl. No.: 947,415

[22] Filed: Dec. 24, 1986

[30] Foreign Application Priority Data

Dec. 27, 1985 [JP] Japan ................................ 60-296957

[51] Int. Cl.⁴ .............................................. B01J 32/00
[52] U.S. Cl. ..................................... 502/439; 502/527
[58] Field of Search ................................ 502/439, 527

[56] References Cited

U.S. PATENT DOCUMENTS

| | | | |
|---|---|---|---|
| 4,131,643 | 12/1978 | Utsunomiya et al. | 502/312 X |
| 4,294,806 | 10/1981 | Abe et al. | 502/527 X |
| 4,358,428 | 11/1982 | Fujita et al. | 502/527 X |

*Primary Examiner*—W. J. Shine
*Attorney, Agent, or Firm*—Wenderoth, Lind & Ponack

[57] ABSTRACT

A molded catalyst for fitting into a reactor vessel having an inlet and an outlet for a reactant gas, the catalyst having openings therethrough parallel to the direction of a reactant gas which is introduced into the reactor vessel from the inlet, the catalyst comprising: a wear-resistant front portion facing the inlet of the reactor vessel, and the remaining portion of the catalyst made so wear-susceptible as to have either:

(a) a wearability of 2–10% in a shaking abrasion test wherein grinding particles having an average particle size of 1000 $\mu$m and a Mohs scale of 9 are placed in the openings of the catalyst in an amount of 50% by volume based on the total volume of the openings, and the catalyst is shaken for three hours with an amplitude of 77 mm and a frequency of 320 per minute; or (b) a wearability of 7.5–35% in an air abrasion test wherein an air which contains silica particles having an average particle size of 40 $\mu$m in amounts of 70 g/m³ is passed through in a reactor vessel including a rectangular parallelepipedic catalyst of 45 mm wide, 45 mm thick and 100 mm long so fitted thereinto that the catalyst extends longitudinally in the direction of the flow of the air for 30 min. at a superficial velocity of 40 m/sec. at the front portion of the catalyst.

1 Claim, No Drawings

MOLDED CATALYST FOR CATALYTIC GAS REACTIONS

The present invention relates to a molded catalyst for use in catalytic gas reactions, and in particular, to a molded solid catalyst composed of ceramic materials suitable for denitrizing at a high and stable denitrizing rate a waste gas including nitrogen oxides therein over a long period of time without a substantial decrease in the denitrizing rate. The invention also relates to a method of performing catalytic gas reactions in particular, catalytic denitrizing reactions to remove nitrogen oxides from waste gases, by the use of the said molded catalyst, Catalytic gas reactions are well known wherein reactant gases are reacted in the presence of a molded solid catalyst composed of ceramic materials. In particular, a fixed bed molded ceramic catalyst which has openings therethrough parallel to the direction of the flow of a reactant gas in a reactor vessel has many advantages over the other structures of fixed bed catalysts. For example, a reactor vessel having such a fixed bed catalyst as above mentioned incorporated therein makes a reactant gas to flow therethrough at a larger linear velocity because of a smaller pressure drop taking place during the passage of the reactant gas through the catalyst than in the other structures of catalysts. Further, even when the reactant gas contains dust therein, the openings of the molded catalyst are little clogged with the dust. These advantages make it possible to carry out catalytic gas reactions at a higher reaction rate. Therefore, the above mentioned fixed bed catalyst is widely used in the denitrization of combustion exhaust gases which contain dust therein from boilers.

However, in the denitrizing reaction by the use of the molded solid catalyst composed of ceramic materials, the catalyst wears especially when the reactant gas contains dust therein, and in particular, the catalyst wears to a large extent at the front portion which faces the inlet of the reactor vessel from which the reactant gas is introduced thereinto. As a result, the molded catalyst is damaged there and often loses its original shape after a long use. Therefore, it has been proposed to make the front portion of the molded catalyst wear-resistant, thereby to reinforce the front portion, as disclosed in Japanese Patent Publication Nos. 57-14211 and 57-26820, and Japanese Patent Disclosure No. 54-71791.

It is true that the molded catalyst having the front portion made wear-resistant as above can stand the wear by dust even when the reactant gas contains dust. However, the inventors have found, after intensive studies on catalytic gas reactions by the use of a molded solid catalyst composed of ceramic materials, that the decrease of the catalytic activity still progresses from the surface with time even when the reactant gas contains no duct therein since oily substances or metallic substances included in the waste gas were found to adhere onto the surface, or to clog micropores on the surface layer of the catalyst, to cause the poisoning of the catalyst or the prevention of the contact of the reactant gas with the surface layer of the catalyst.

For example, combustion exhaust gases from coal fired boilers and waste gases from cement kilns contain calcium salts and arsenic; combustion exhaust gases of living wastes contain silica; and waste gases from glass melting furnaces contain sodium sulfate. These solid materials adhere onto the surface of a denitrizing catalyst to clog micropores of the catalyst, thereby to prevent the reactant gas from diffusing into the catalyst, so that the catalytic denitrizing activity of the catalyst decreases with time. On the other hand, exhaust gases from heavy-oil or resiual oil or oil coke fired boilers contain vanadium compounds very often. Since vanadium compounds are catalytically active for denitrizing nitrogen oxides as is known, they have been found not to cause the decrease of the denitrizing activity of the catalyst. However, when the reactant gas contains sulfur dioxide therein, the vanadium compound has been found to increase the conversion of sulfur dioxide to sulfur trioxide, and the resultant sulfur trioxide undesirably corrodes reactors and related parts but also causes air pollution when being discharged into the air.

Therefore, the present inventors have made a further intensive study on molded ceramic catalysts, and found that a molded ceramic catalyst which is so formed as to be wear-resistant at the front portion, but is rather wear-susceptible at the remaining part, does not exhibit a decrease with respect to time in the catalytic denitrizing activity by wearing or grinding the said remaining part during the catalytic gas reaction.

It is, therefore, an object of the invention to provide a molded ceramic catalyst which is not substantially decreased in the catalytic activity with time during a catalytic gas reaction.

It is a specific object of the invention to provide such a molded ceramic catalyst for catalytic denitrizion of nitrogen oxides cintained in waste gases as retains a high catalytic activity over a long time.

It is a further object of the invention to provide a method of performing catalytic gas reactions by the use of said catalyst.

It is still another important object of the invention to provide a method of catalytically denitrizing nitrogen oxides contained in waste gases by use of a molded ceramic catalyst at a high reaction rate over a long time.

According to the invention, there is provided a molded catalyst for fitting into a reactor vessel having an inlet and an outlet for a reactant gas, the catalyst having openings therethrough parallel to the direction of a reactant gas which is introduced into the reactor vessel from the inlet, the catalyst comprising: a wear-resistant front portion facing the inlet of the reactor vessel, and the remaining part of the catalyst made so wear-susceptible as to have:

(a) a wearability of 2-10% in a shaking abrasion test wherein grinding particles having an average particle size of 1000 $\mu$m and a Mohs scale of 9 are placed in the openings of the catalyst in an amount of 50% by volume based on the total volume of the openings, and the catalyst is shaken for three hours with an amplitude of 77 mm and a frequency of 320 per minute; or (b) a wearability of 7.5-35% in an air abrasion test wherein an air which contains silica particles having an average particle size of 40 $\mu$m in amounts of 70 g/m$^3$ is passed through a reactor vessel including a rectangular parallelepipedic catalyst of 45 mm wide, 45 mm thick and 100 mm long so fitted thereinto that the catalyst extends londitudinally in the direction of the flow of the air for 30 min. at a superficial velocity of 40 m/sec. at the front face of the catalyst.

The molded catalyst herein the specification means a catalyst molded not only so as to be fittable into a reactor vessel having an inlet and an outlet for a reactant gas thereby to form a fixed bed catalyst in the reactor vessel, but also so as to have openings therethrough parallel to the direction of the flow of the reactant gas which is introduced into the reactor vessel from the inlet. A representative example of such a molded catalyst may be a molded catalyst of a so-called honey-comb structure composed of ceramic materials.

There are further included in the molded catalyst, for instance, a catalyst which is composed of a plurality of molded plates held in a reactor vessel each parallel to the direction of the flow of a reactant gas, or a tubular catalyst which has a single opening therethrough parallel to the direction of the flow of a reactant gas in a reactor vessel.

However, the molded catalyst is not limited to the above exemplifications. The molded catalyst further includes a catalyst which is composed of a metal net which has on the either side thereof layers of ceramic materials containing catalytic active ingredients therein, as well as one or more of openings extending in the direction of the flow of a reactant gas in a reactor vessel, thereby to form a fixed bed catalyst therein.

Any method which is already known may be available to provide both the front surface of the catalyst facing the inlet of the reactor vessel and a continuation of the front surface extending therefrom over a certain length along the axial direction of the catalyst, with wear-resistance. Herein the specification, the front surface and the continuation thereof are referred to as the front portion. For example, the front portion may be made wear-resistant by bonding thereto a metal cap or a ceramic cap composed of molded ceramics such as titanium dioxide, codierite or mullite sintered at 800° C. or higher, as disclosed in Japanese Patent Publication No. 57-14211. As a further example, the front portion may be made wear-resistant by covering the front portion with glaze or glass, as disclosed in Japanese Patent Publication No. 57-26820.

As a still further example of providing the front portion with wear-resistance, the front portion is immersed in an aqueous solution or slurry of water-soluble polyphosphates such as metaphosphate, which further contains, when desired, alkali silicates, aggregates such as magnesia clinker, sodium orthophosphate or clay, to make the solution or slurry adhere onto the front portion, which is then heated at temperatures of 200°–1000° C., to form a wear-resistant layer on the front portion, as disclosed in Japanese Patent Disclosure No. 54-71791. In the above method, a solution or slurry containing the water-soluble polyphosphate in amounts of more than 0.5% by weight, preferably more than 3% by weight, is usually used.

The front portion of the molded catalyst is made wear-resistant preferably over a length of 1 to 20 times, most preferably 5 to 15 times, as long as the equivalent diameter of the openings of the catalyst. When the catalyst is made wear-resistant over too a short distance in the axial direction, the wear of the catalyst at the front portion cannot be fully prevented. This is the case especially when the catalyst is long in the axial direction and the reactant gas contains dust therein. As an exemplification, when the catalyst has an axial length of 500–1000 mm and openings of an equivalent diameter of 6 mm, the wear-resistant portion is preferably about 50 mm long in the axial direction from the front surface of the catalyst. However, when desired, only the front surface may be made wear-resistant. Meanwhile, when the wear-resistant portion extends too long, the catalyst is unnecessarily covered with a wear-resistant material over a large area, so that the catalyst has undesirably a low catalytic activity.

According to the invention, the molded catalyst is made wear-resistant at the front portion whereas the remaining part is made so wear-susceptible as to have either a wearability of 2–10% when the catalyst is subjected to a shaking abrasion test, or a wearability of 7.5–35 % when the catalyst is subjected to an air abrasion test, which are carried out as follows.

Shaking Abrasion Test:

A wire gauze is placed under the catalyst to hold therein grinding particles placed in the openings of the catalyst but to permit the resultant abrasion powder of the catalyst under the test to pass through the wire gauze. The grinding particle used has an average particle size of 1000 μm and a Mohs scale of 9. The particle is charged in the openings in an amount of 50 % by volume based on the total volume of the openings of the catalyst. The catalyst is then fitted to a vibratory station of a shaking abrasion tester so that the openings of the catalyst are vertical while the upper surface of the catalyst is covered with a rubber sheet. The catalyst is then shaken up and down for three hours with an amplitude of 77 mm and a frequency of 320 per minute, and thereafter, the grinding particle and the resultant abrasion powder of the catalyst are removed from the catalyst. The wearability of the catalyst is defined as $[(W_o-W)/W_o]\times 100$ (%), wherein $W_o$ is the initial weight of the catalyst, and W is the weight after the shaking as above mentioned.

Air Abrasion Test:

A rectangular parallelepipedic catalyst of 45 mm wide, 45 mm thick and 100 mm long is so fitted into a reactor vessel having an inlet and an outlet that the catalyst extends longitudinally in the direction of the flow of an air which is passed through the reactor vessel, and an air which contains silica particles having an average particle size of 40 μm in amounts of 70 g/m$^3$ is so passed through the reactor vessel for 30 min. as to have a superficial velocity of 40 m/sec. at the front face of the catalyst. Thereafter the silica particle and the resultant abrasion powder of the catalyst are removed from the catalyst. The wearability of the catalyst is defined in the same way as above.

Either when the wearability according to the shaking abrasion test is smaller than 2%, or when the wearability according to the air abrasion test is smaller than 7.5%, it will be difficult to remove poisonous substances adhered onto the surface of the catalyst during the catalytic gas reaction from the surface by wearing of the catalyst itself, and as a result, the catalytic activity is decreased with time. On the other hand, either when the wearability according to the shaking abrasion test is larger than 10%, or when the wearability according to the air abrasion test is larger than 35%, the catalyst will be worn to such an extent that it is practically unusable.

In general, when the catalytic gas reaction is carried out in a reactor vessel by the use of a molded catalyst which has openings therethrough in the direction of the flow of a reactant gas, it often happens that the catalyst is also worn at the walls which form the openings at the rear portion. Therefore, the rear surface facing the exit for the reactant gas in the reactor vessel and a continuation thereof extending axially from the rear surface may also be made wear-resistant over a certain distance, if desired, in the same manner as aforementioned.

The molded catalyst of the invention is not limited to any specified catalystic gas reaction in use, however, the catalyst is especially suitable for the denitrization of combustion exhaust gases, for example, as previously described. The production of the denitrizing catalyst is already well known. The catalyst of the invention is also usable for oxidation of industrial waste gases.

According to the invention, there is further provided a method of catalytic gas reactions in which a molded catalyst having openings therethrough is fitted into a reactor vessel having an inlet and an outlet for a reactant gas so that the openings extend in the direction of the flow of the reactant gas, and the catalyst comprises a wear-resistant front portion facing the inlet and a continuation of the front surface extending therefrom, the both being the front portion of the catalyst, and the remaining part made so wear-susceptible as to have either:

(a) a wearability of 2–10% in a shaking abrasion test wherein grinding particles having an average particles size of 1000 μm and a Mohs scale of 9 are placed in the openings of the catalyst in an amount of 50% by volume based on the total volume of the openings, and the catalyst is shaken for three hours with an amplitude of 77 mm and a frequency of 320 per minute; or (b) a wearability of 7.5–35% in an air abrasion test wherein an air which contains silica particles having an average particle size of 40 μm in amounts of 70 g/m$^3$ is passed through in a reactor vessel including a rectangular parallelepipedic catalyst so fitted thereinto that the catalyst extends longitudinally in the direction of the flow of the air for 30 min. at a superficial velocity of 40 m/sec. at the front face of the catalyst.

the method comprising: allowing grinding particles to exist continuously or intermittently in the reactant gas fed into the reactor vessel, thereby to wear the surface layer of the said remaining part of the catalyst with the grinding particle.

Namely, the molded catalyst is ground at the surface layer of the wear-susceptible portion with the grinding particle during the catalytic gas reaction to remove poisoning substances adhered onto the surface layer of the catalyst during the catalytic gas reaction. The removal of the poisoned surface layer in this manner has the active surface layer of the catalyst exposed anew continuously, and accordingly, the catalyst is maintained high in the activity over a long period through the reaction even when the poisoning substances are adhered onto the surface layer of the catalyst during the reaction.

As is the case with a combustion exhaust gas from a pulverized coal fired boiler, when a reactant gas contains dust therein, the dust is regarded as, and in fact, acts as grinding particles. However, when a reactant gas contains no dust therein, then grinding particles are admixed with the reactant gas continuously or intermittently to make the grinding particle to exist in the reactant gas. Particles which are 1–100 μm in average particle size, preferably coal dust of several tens μm, are usable as the grinding particle.

The preferable amount of the grinding particles existing in or admixed with a reactant gas is dependent not only on the wearability of the wear-susceptible portion of the catalyst used, but also acts to make the grinding particle exist in the reactant gas, and the particle size and hardness of the particle, and therefore, cannot be specified. However, when the coal dust is used as grinding particles as described hereinbefore, it is preferable that the reactant gas contains the dust in amounts of about 1–100 g/Nm$^3$.

A plurality of molded catalysts may be fitted into a reactor vessel so that the openings are in line with each other depending upon a gas reaction to be carried out or the size of the catalyst used. In these cases, a catalyst next to the nearest to the inlet of the reactant gas in the reactor vessel and even catalysts fitted into the reaction vessel a little farther from the inlet may be worn at the front portions when the reactant gas contains dust therein. Furthermore, these catalysts, although not being placed nearest to the inlet of the reactor vessel, may be also decreased with time in the activity on account of the adhesion of poisoning substances onto the surface of the catalyst as hereinbefore set forth. Therefore, it is desirable that the catalyst next to the nearest to the inlet and those catalyst placed a little farther from the inlet are also made wear-resistant at the front portions, respectively, when the fixed bed includes a plurality of molded catalysts fitted into the reactor vessel in line with each other.

As fully set forth above, the catalyst of the invention is made wear-resistant at the front portion whereas the remaining part are made so wear-susceptible as to have a specified wearability as defined hereinbefore. Therefore, the wear of the front portion of the catalyst is prevented, which is otherwise worn to a large extent, since the reactant gas introduced into the reactor vessel comes first into contact with the front portion of the catalyst with a large linear velocity, and as a result, the catalyst maintains a strength necessary for catalytic gas reactions over a whole mold. Further, since the surface layer of the catalyst having poisoning substances adhered thereon such as oily substances or metallic substances which deteriorate the catalytic activity are removed during the gas reaction by the grinding particle which is either inherently present in or is added to the reactant gas, a catalytic gas reaction such as the denitrization reaction of combustion exhaust gases or oxidation reaction of industrial waste gases can be carried out at a high and stable reaction rate over a long period of time.

However, the molded catalyst and the method according to the invention are not restricted in use to the above exemplified, as will be readily understood.

Examples of the invention will be now described, but the invention is not limited to the examples.

EXAMPLE 1

Metatitanic acid obtained as an intermediate product from the production of titanium dioxide by the sulfuric acid process was made neutral, washed with water and then calcined at a temperature of 500° C. for 3 hours to provide titanium dioxide, which was then pulverized to powder of 2 μm in average particle size.

An amount of 300 l of an aqueous solution of monoethanol amine containing 5 kg of vanadium pentoxide and 112 kg of ammonium paratungstate dissolved therein, 50 kg of polyvinyl alcohol and 100 kg of E glass chopped strand (fiber length of 5 mm, fiber diameter of 12 μm, Nitto Boseki K.K.) were added to about 100 l of water together with 800 kg of the above titanium dioxide, and the resultant mixture was kneaded with a kneader.

The kneaded mixture was molded to a honeycomb structure by the use of a vacuum extruder provided with extrusion dies. The green mold was left standing for a sufficient time and then dried at a temperature of 100° C. for 5 hours under ventilation. Both the axial end portions were cut out so that the catalyst had a predetermined axial length, and then calcined in an electric oven at a temperature of 450° C. for 3 hours, to provide a honeycomb catalyst for the denitrizing reaction. The catalyst had a cell pitch of 7.4 mm, a wall thickness of 1.5 mm, an outer diameter of 150 mm×150 mm, an axial length of 500 mm and an equivalent diameter of 5.9 mm.

Meanwhile, an aqueous solution of aluminum primary phosphate (containing 33% of $P_2O_5$ and 8.5% of $Al_2O_3$, and having a pH of 11.4) was diluted twice with water and then was heated to 70° C.

Then the honeycomb catalyst was heated to about 70°0 C., and the front portion was immersed in the solution of the aluminum primary phosphate over a length of 30 mm from the front surface for about 5 minutes, and then was pulled up from the solution. An excess amount of the solution on the catalyst was removed with a blow, and then the catalyst was dried at 110° C. overnight, and thereafter heated at 400° C. for 3 hours, to make the catalyst wear-resistant at the front portion. The remaining wear-susceptible part of the catalyst was found to have a wearability bility of 7.2% in the shaking abrasion test as previously set forth wherein "Abrax #20-A" of 1000 μm in average particle size and of 9 in Mohs scale (Nihon Kenmazai Kogyo K.K.) was used as grinding particles, while the catalyst was found to have a wearability of 29.4% in the air abrasion test as defined hereinbefore.

An amount of 0.2 m$^3$ (apparent volume) of the catalyst was fitted into a reactor vessel so that the wear-resistant front portion faced the inlet of the reactor vessel for a reactant gas.

A combustion exhaust gas from a boiler fired with a fuel composed of a residual oil as an by-product of petroleum refining and asphalt was mixed with ammonia so that the ammonia/nitrogen oxides molar ratio in the resultant gas mixture came to 1.0, and the gas mixture was fed into the reactor vessel at a temperature of 380° C. with a superficial gas velocity of 7.9 m/sec. and a space velocity of 5160 hr$^{-1}$, while coal dust of average particle size of about 20 μm was added to the reactant gas in amounts of about 100 g/Nm$^3$ for 1 hour every 500 hours, thereby to wear the catalyst at the wear-susceptible surface layer to remove layers poisoned with vanadium compounds.

The initial properties of the combustion exhaust gas were as follows:
  dust concentration: 600 mg/Nm$^3$
  sulfur oxides: 2600 ppm
  nitrogen oxides: 290 ppm
  oxygen: 1.8%

The denitrizing reaction was carried out for about 8000 hours while the dust and the resulting abrasion powder of the catalyst were collected and removed by the use of a cyclone.

The denitrizing rate, $SO_3$ conversion and change in the wall-thickness of the catalyst are shown in Table. The denitrizing rate is defined by: (($NO_x$ concentration at the inlet of the reactor - $NO_x$ concentration at the outlet of the reactor)/($NO_x$ concentration at the inlet of the reactor)) x 100 (%), and the $SO_3$ conversion is defined by: (($SO_3$ concentration at the outlet of the reactor - $SO_3$ concentration at the inlet of the reactor)/($SO_3$ concentration at the outlet of the reactor)) $\times$ 100 (%).

EXAMPLE 2

A combustion waste gas having the composition:
  dust concentration: 1 g/Nm$^3$
  sulfur oxides : 300 ppm
  nitrogen oxides : 600 ppm
  oxygen : 4% from a boiler fired with a thermal decomposition gas of living wastes was mixed with ammonia so that the ammonia/nitrogen oxides molar ratio in the resulting gas mixture came to 1.0. and the gas mixture was fed into a reactor vessel having the same catalyst as in Example 1 in amounts of 0.2 m$^3$ with a superficial gas velocity of 7.2 m/sec. and a space velocity of 4700 hr$^{-1}$, while coal dust of average particle size of about 20 μm was added to the reactant gas in amounts of about 100 g/Nm$^3$ for 1 hour every 500 hours, thereby to wear the catalyst at the wear-susceptible surface layer to remove layers contaminated with silica. The denitrizing reaction was carried for about 6000 hours, while the dust and the resulting abrasion powder of the catalyst were collected and removed by a cyclone.

The denitrizing rate, $SO_3$ conversion and change in the wall-thickness of the catalyst are shown in Table.

EXAMPLE 3

Metatitanic acid obtained as an intermediate product from the production of titanium dioxide by the sulfuric acid process was made neutral, filtered, and washed with water, to provide a cake of metatitanic acid. To the metatitanic acid (in amounts of 820 kg in terms of titanium dioxide) was added 8 kg of 67.5% nitric acid to partially peptize the metatitanic acid. Thereafter, the resulting sol was evaporated to solid, and calcined for 3 hours at a temperature of 450° C. to provide titanium dioxide, which was then cooled and pulverized to powder of 2 μm in average particle size.

An amount of 300 l of an aqueous solution of monoethanol amine containing 5 kg of vanadium pentoxide and 112 kg of ammonium paratungstate dissolved therein, 50 kg of polyvinyl alcohol and 100 kg of the same E glass chopped strand as used in Example 1 were added to about 100 l of water together with 800 kg of the above titanium dioxide, and the resultant mixture was kneaded with a kneader.

The kneaded mixture was molded to a honeycomb structure in the same manner as in Example 1, and the resulting green mold was left standing for a sufficient time and then dried at a temperature of 100° C. for 5 hours under ventilation. Both the axial end portions were cut out so that the catalyst had a predetermined axial length, and then calcined in an electric oven at a temperature of 500° C. for 3 hours, to provide a honeycomb catalyst for the denitrizing reaction. The catalyst had a cell pitch of 7.4 mm, a wall thickness of 1.5 mm, an outer diameter of 150 mm×150 mm, an axial length of 500 mm, and an equivalent diameter of 5.9 mm.

Then the honeycomb catalyst was made wear-resistant at the front portion over a length of 30 mm from the front surface in the same manner as in Example 1. The remaining part of the catalyst was found to have a wearability of 4.3% in the shaking abrasion test as previously described, and a wearability of 14.7% in the air abrasion test.

An amount of 0.2 m$^3$ (apparent volume) of the catalyst was fitted into a reactor vessel, and the denitrizing reaction was carried out as follows.

A combustion exhaust gas from a coal fired boiler was mixed with ammonia so that the ammonia/nitrogen oxides molar ratio in the resulting gas mixture came to 1.0, and the gas mixture was fed into the reactor vessel at a temperature of 380° C. with a superficial gas velocity of 6.1 m/sec. and a space velocity of 2800 hr$^{-1}$. The reaction was carried out for about 4000 hours.

The initial properties of the combustion exhaust gas were as follows:
dust concentration: 20 g/Nm$^3$
sulfur oxides: 800 ppm
nitrogen oxides: 240 ppm
oxygen : 4%
The results are shown in Table.

EXAMPLE 4

An amount of 300 l of an aqueous solution of monoethanol amine containing 5 kg of vanadium pentoxide and 112 kg of ammonium paratungstate dissolved therein, 50 kg of polyvinyl alcohol, 100 kg of the same E glass chopped strand as used in Example 1 and 40 kg of pulp flock (W-1, Sanyo Kokusaku Pulp K.K.) were mixed with about 100 l of water together with 800 kg of the same titanium dioxide as used in Example 1, and the resultant mixture was kneaded.

The kneaded mixture was molded to a honeycomb structure and the catalyst was made wear-resistant at the front portion in th same manner as in Example 1. The remaining wear-susceptible part of the catalyst was found to have a wearability of 9.1% in the shaking abrasion test in the same manner as in Example 1, and 32.0% in the air abrasion test.

An amount of 0.2 m$^3$ (apparent volume) of the catalyst was fitted into a reactor vessel and was used for the denitrization of the same combustion gas in the same manner as in Example 1. The denitrizing rate, SO$_3$ conversion and change in the wall-thickness of the catalyst are shown in Table.

EXAMPLE 5

Metatitanic acid obtained as an intermediate product from the production of titanium dioxide by the sulfuric acid process was made neutral, filtered, and washed with water, to provide a cake of metatitanic acid. To the metatitanic acid (in amounts of 820 kg in terms of titanium dioxide) was added 38 kg of 67.5% nitric acid to completely peptize the metatitanic acid. Thereafter, the resulting sol was evaporated to solid, and calcined for 3 hours at a temperature of 450° C. for 3 hours to provide titanium dioxide, which was then cooled and pulverized to powder of 0.8 μm in average particle size.

An amount of 300 l of an aqueous solution of monoethanol amine containing 5 kg of vanadium pentoxide and 112 kg of ammonium paratungstate dissolved therein, 50 kg of polyvinyl alcohol, 100 kg of the same E glass chopped strand as used in Example 1 and the pulp flock as used in Example 3 were added to 800 kg of the above titanium dioxide together with about 100 kg of silica sol, "Snowtex-N" (containing 20% of SiO$_2$, Nissan Kagaku Kogyo K.K.), and the resultant mixture was kneaded.

The kneaded mixture was molded to a honeycomb structure in the same manner as in Example 1, and the resulting green mold was left standing for a sufficient time and then dried at a temperature of 100° C. for 5 hours under ventilation. Both the axial end portions were cut out so that the catalyst had a predetermined axial length, and then calcined in an electric oven at a temperature of 500° C. for 3 hours, to provide a honeycomb catalyst for the denitrizing reaction. The catalyst had a cell pitch of 7.4 mm, a wall thickness of 1.5 mm, an outer diameter of 150 mm × 150 mm, an axial length of 500 mm, and an equivalent diameter of 5.9 mm The catalyst was made wear-susceptible at the front portion in the same manner as in Example 1. The remaining wear-susceptible part of the catalyst was found to have a wearability of 3.0% in the shaking abrasion test as previously described, and a wearability of 8.2% in the air abrasion test as defined hereinbefore.

An amount of 0.2 m$^3$ (apparent volume) of the catalyst was fitted into a reactor vessel, and the same combustion exhaust gas as in Example 1 from a boiler fired with a mixture of a residual oil and asphalt was denitrized in the same manner as in Example 1. The results are shown in the Table.

REFERENCE EXAMPLE 1

The same combustion exhaust gas produced by burning a fuel composed of asphalt and by-produced oil as in Example 1 was denitrized in the same manner as in Example 1 except the use of a catalyst which was not made wear-resistant at the front portion. The results are shown in the Table.

REFERENCE EXAMPLE 2

The same combustion exhaust gas from a boiler fired with the same thermal decomposition gas of living wastes as in Example 2 was denitrized in the same manner as in Example 2 except the use of a catalyst which was not made wear-resistant at the front portion. The results are shown in the Table.

REFERENCE EXAMPLE 3

The same combustion exhaust gas from a coal fired boiler as in Example 3 was denitrized in the same manner as in Example 3 except the use of a catalyst which was not made wear-resistant at the front portion. The results are shown in the Table.

REFERENCE EXAMPLE 4

Metatitanic acid obtained as an intermediate product from the production of titanium dioxide by the sulfuric acid process was made neutral, filtered, and washed with water, to provide a cake of metatitanic acid. To the metatitanic acid (in amounts of 820 kg in terms of titanium dioxide) was added 38 kg of 67.5% nitric acid to completely peptize the metatitanic acid. Thereafter, the resulting sol was evaporated to solid, and calcined for 3 hours at a temperature of 450° C. for 3 hours to provide titanium dioxide, which was then cooled and pulverized to powder of 0.8 μm in average particle size.

An amount of 300 l of an aqueous solution of monoethanol amine containing 5 kg of vanadium pentoxide and 112 kg of ammonium paratungstate dissolved therein, 50 kg of polyvinylalcohol and 100 kg of the same E glass chopped strand as used in Example 1 were added to 800 kg of the above titanium dioxide together with about 100 kg of silica sol, "Snowtex-N" (containing 20% of SiO$_2$, Nissan Kagaku Kogyo K.K.), and the resultant mixture was kneaded with a kneader.

The kneaded mixture was molded to a honeycomb structure in the same manner as in EXAMPLE 1, and the resulting green mold was left standing for a sufficient time and then dried at a temperature of 100° C. for 5 hours under ventilation. Both the axial end portions were cut out so that the catalyst had a predetermined axial length, and then calcined in an electric oven at a temperature of 500° C. for 3 hours, to provide a honeycomb catalyst for the denitrizing reaction. The catalyst had a cell pitch of 7.4 mm, a wall thickness of 1.5 mm, an outer diameter of 150 mm×150 mm, an axial length of 500 mm, and an equivalent diameter of 5.9 mm.

version and change in the wall-thickness of the catalyst are shown in the Table.

TABLE

| | Denitrizing Rate (%) | | $SO_3$ Conversion (%) | | Wall Thickness* (mm) | | Axial Length* (mm) | |
|---|---|---|---|---|---|---|---|---|
| | Initial | After Reaction | Initial | After Reaction | Initial | After Reaction | Initial | After Reaction |
| Example | | | | | | | | |
| 1 | 94 | 94 | 0.5 | 0.6 | 1.50 | 1.35 | 500 | 500 |
| 2 | 96 | 95 | — | — | 1.50 | 1.40 | 500 | 500 |
| 3 | 96 | 95 | — | — | 1.50 | 1.45 | 500 | 500 |
| 4 | 96 | 96 | 0.5 | 0.6 | 1.50 | 1.35 | 500 | 500 |
| 5 | 94 | 93 | 0.5 | 0.8 | 1.50 | 1.45 | 500 | 500 |
| Reference | | | | | | | | |
| 1 | 94 | 94 | 0.5 | 0.6 | 1.50 | 1.35 | 500 | 453 |
| 2 | 96 | 95 | — | — | 1.50 | 1.40 | 500 | 477 |
| 3 | 96 | 95 | — | — | 1.50 | 1.45 | 500 | 485 |
| 4 | 92 | 92 | 0.5 | 2.0 | 1.50 | 1.50 | 500 | 500 |
| 5 | 94 | 78 | — | — | 1.50 | 1.50 | 500 | 500 |
| 6 | 94 | 90 | — | — | 1.50 | 1.50 | 500 | 500 |
| 7 | 96 | 96 | 0.5 | 0.6 | 1.50 | 0.90 | 500 | 500 |

*At the axially and sectionally central part of the catalyst.

The catalyst was found to have a wearability of 1.2% in the shaking abrasion test as previously described, and a wearability of 6.1% in the air abrasion test as defined before.

An amount of 0.2 m³ (apparent volume) of the catalyst was fitted into a reactor vessel, and the same combustion exhaust gas as in Example 1 from a boiler fired with a mixture of a residual oil and asphalt was denitrized in the same manner as in Example 1. The results are shown in the Table.

REFERENCE EXAMPLE 5

An amount of 0.2 m³ (apparent volume) of the same catalyst as in Reference Example 4 was fitted into a reactor vessel, and the same combustion exhaust gas as used in Example 2 from a boiler fired with a thermal decomposition gas of living wastes was denitrized in the same manner as in Example 2. The results are shown in the Table.

REFERENCE EXAMPLE 6

An amount of 0.2 m³ (apparent volume) of the same catalyst as in Reference Example 4 was fitted into a reactor vessel, and the same combustion exhaust gas as in Example 3 from a coal fired boiler was denitrized in the same manner as in Example 3. The results are shown in the Table.

REFERENCE EXAMPLE 7

An amount of 300 l of an aqueous solution of monoethanol amine containing 5 kg of vanadium pentoxide and 112 kg of ammonium paratungstate dissolved therein, 50 kg of polyvinyl alcohol, 100 kg of the same B glass chopped strand as used in Example 1 and 80 kg of pulp flock (W-1, Sanyo Kokusaku Pulp K.K.) were mixed with about 100 l of water together with 800 kg of the same titanium dioxide as used in Example 1, and the resultant mixture was kneaded.

The kneaded mixture was molded to a honeycomb structure and the catalyst was made wear-resistant at the front portion in the same manner as in Example 1. The remaining wear-susceptible part of the catalyst was found to have a wearability of 13.5% in the shaking abrasion test in the same manner as in Example 1, and 40.1% in the air abrasion test.

An amount of 0.2 m³ (apparent volume) of the catalyst was fitted into a reactor vessel and was used for denitrization of the same combustion gas in the same manner as in Example 1. The denitrizing rate, $SO_3$ conversion and change in the wall-thickness of the catalyst are shown in the Table.

As clearly illustrated in Table, the catalyst of the invention has been found not to be substantially decreased in the denitrizing rate over a long period of time. On the contrary to this, the catalyst according to Reference Examples 1 to 3 were found to be diminished at the front portion by 15-40 mm in the axial direction, and was found not to endure a long term use.

The catalyst according to Reference Examples 4 to 6 had a wearability of 1.2% in the shaking abrasion test and 6.1% in the air abrasion test, and were hard as a whole, and therefore these catalysts were found to stand the abrasion, however, the catalysts were found to decrease in the denitrizing activity or increase in the $SO_3$ conversion with time, so that these catalysts were also found not to endure a long term use.

The catalyst of Reference Example 7 has a larger wearability than that defined in the invention, so that the catalyst was found to be decreased remarkably in the wall thickness and was found not to stand practical use over a long time.

What is claimed is:

1. A molded catalyst for fitting into a reactor vessel having an inlet and an outlet for a reactant gas, the catalyst having openings therethrough parallel to the direction of a reactant gas which is introduced into the reactor vessel from the inlet, the catalyst comprising: a wear-resistant front portion substantially facing the inlet of the reactor vessel. and a remaining portion, said remaining portion being so wear-susceptible as to have either:

(a) a wearability of 2–10% in a shaking abrasion test wherein grinding particles having an average particle size of 1000 μm and a Mohs scale of 9 are placed in the openings of the catalyst in an amount of 50% by volume based on the total volume of the openings, and the catalyst is shaken for three hours with an amplitude of 77 mm and a frequency of 320 per minute; or (b) a wearability of 7.5–35% in an air abrasion test wherein an air which contains silica particles having an average particle size of 40 μm in amounts of 70 g/m³ is passed through in a reactor vessel including a rectangular parallelepipedic catalyst of 45 mm wide, 45 mm thick and 100 mm long so fitted thereinto that the catalyst extends longitudinally in the direction of the flow of the air for 30 min. at a superficial velocity of 40 m/sec. at the front portion of the catalyst.

* * * * *